(12) United States Patent
Yip (10) Patent No.: US 7,882,306 B2
(45) Date of Patent: *Feb. 1, 2011

(54) METHOD FOR SUBSTANTIALLY UNINTERRUPTED CACHE READOUT

(75) Inventor: Aaron Yip, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/437,201

(22) Filed: May 7, 2009

(65) Prior Publication Data

US 2009/0216948 A1 Aug. 27, 2009

Related U.S. Application Data

(63) Continuation of application No. 11/474,436, filed on Jun. 26, 2006, now Pat. No. 7,546,416.

(51) Int. Cl.
*G06F 12/08* (2006.01)
*G06F 12/00* (2006.01)

(52) U.S. Cl. ............... 711/118; 711/140; 711/E12.044; 711/103; 711/E12.008

(58) Field of Classification Search ........................ None
See application file for complete search history.

(56) References Cited

U.S. PATENT DOCUMENTS

| 6,243,291 | B1 | 6/2001 | Cheah | |
|---|---|---|---|---|
| 7,123,521 | B1 | 10/2006 | Louie et al. | |
| 7,369,447 | B2 | 5/2008 | Louie et al. | |
| 7,372,744 | B2 | 5/2008 | Shiga et al. | |
| 2005/0226046 | A1* | 10/2005 | Lee et al. | 365/185.12 |
| 2005/0232011 | A1 | 10/2005 | Lee et al. | |
| 2007/0011405 | A1* | 1/2007 | Adusumilli | 711/122 |
| 2007/0165458 | A1* | 7/2007 | Leong et al. | 365/185.12 |

* cited by examiner

*Primary Examiner*—Denise Tran
(74) *Attorney, Agent, or Firm*—Dickstein Shapiro LLP (57) ABSTRACT

A memory device capable of sequentially outputting multiple pages of cached data while mitigating any interruption typically caused by fetching and transferring operations. The memory device outputs cached data from a first page while data from a second page is fetched into sense amplifier circuitry. When the outputting of the first page reaches a predetermined transfer point, a portion of the fetched data from the second page is transferred into the cache at the same time the remainder of the cached first page is being output. The remainder of the second page is transferred into the cache after all of the data from the first page is output while the outputting of the first portion of the second page begins with little or no interruption.

25 Claims, 8 Drawing Sheets

METHOD FOR SUBSTANTIALLY UNINTERRUPTED CACHE READOUT

This application is a continuation of application Ser. No. 11/474,436, filed on Jun. 26, 2006, now U.S. Pat. No. 7,546,416, issued on Jun. 9, 2009, which is hereby incorporated by reference in its entirety.

FIELD OF THE INVENTION

The invention relates generally to a method and apparatus for operating a memory device to have cache readout.

BACKGROUND OF THE INVENTION

A nonvolatile memory is a type of memory that retains stored data when power is removed. There are various types of nonvolatile memories including e.g., read only memories (ROMs), erasable programmable read only memories (EPROMs), and electrically erasable programmable read only memories (EEPROMs). One type of EEPROM device is a flash EEPROM device (also referred to as "flash memory").

Each nonvolatile memory device has its own unique characteristics. For example, the memory cells of an EPROM device are erased using an ultraviolet light, while the memory cells of an EEPROM device are erased using an electrical signal. In a conventional flash memory device blocks of memory cells are simultaneously erased (what has been described in the art as a "flash-erasure"). The memory cells in a ROM device, on the other hand, cannot be erased at all. EPROMs, and EEPROMs, including flash memory, are commonly used in computer systems that require reprogrammable nonvolatile memory.

Two common types of flash memory architectures are the "NAND" and "NOR" architectures, so called for the resemblance which the basic memory cell configuration of each architecture has to a basic NAND or NOR gate circuit, respectively. In the NOR architecture, the floating gate memory cells of the memory array are arranged in a matrix. The gates of each floating gate memory cell of the array matrix are connected by rows to word lines and their drains are connected to bit lines. The source of each floating gate memory cell is typically connected to a common source line. The NOR architecture floating gate memory array is accessed by a row decoder activating a row of floating gate memory cells by selecting the word line connected to their gates. The data values of memory cells in a selected row are placed on the bit lines based on the application of a current from the connected source line to the connected bit lines.

A NAND array architecture also arranges its array of floating gate memory cells in a matrix such that the gates of each floating gate memory cell are connected by rows to word lines. However, each memory cell is not directly connected to a source line and a bit line. Instead, the memory cells of the array are arranged together in strings, typically of 8, 16, 32, or more, where the memory cells in the string are connected together in series, source to drain, between a common source line and a bit line. The NAND architecture floating gate memory array is then accessed by a row decoder activating a row of floating gate memory cells by selecting the word line connected to their gates. In addition, the word lines connected to the gates of the unselected memory cells of each string are also driven. However, the unselected memory cells of each string are typically driven by. a higher gate voltage so as to operate them as pass transistors, allowing them to pass current in a manner that is unrestricted by their stored data values. Current then flows from the bitline to the source line through the channel of each memory cell of the connected string, restricted only by the memory cells of each string that are selected to be read. Thereby, the current encoded stored data values of the row of selected memory cells are placed on the bit lines.

Generally, in a single level flash memory device, a charged floating gate represents one logic state, e.g., a logic "0", while a non-charged floating gate represents the opposite logic state e.g., a logic "1". A memory cell of a flash array is programmed by placing the floating gate into one of these charged states. Charges may be injected or written onto the floating gate by any number of methods, including e.g., avalanche injection, channel injection, Fowler-Nordheim tunneling, and channel hot electron (CHE) injection. The floating gate may be discharged or erased by any number of methods including e.g., Fowler-Nordheim tunneling. Multi-level programmable flash memory cells are also known.

Figure 1:
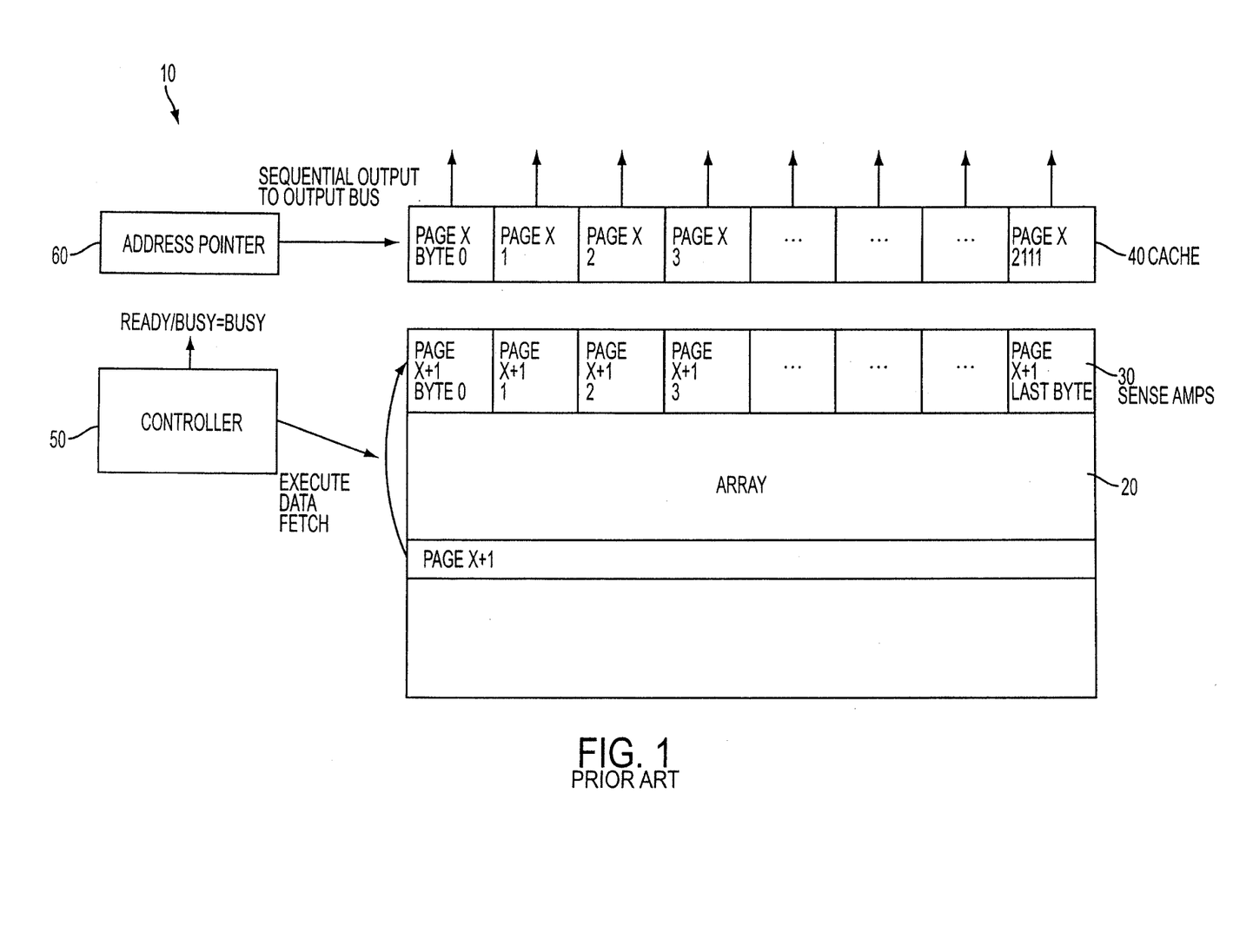
FIG. 1 illustrates a conventional memory device performing data readout of cached page x data and a fetch of page x+1 data.

FIG. 1 illustrates a conventional memory device 10 (e.g., a NAND flash memory device). The memory device 10 includes a memory array 20, sense amplifiers 30, an output data cache 40 and a controller 50. The controller 50 controls operation of the device 10 and, as part of its operation, monitors an address pointer 60, which may be part of an address register, input/output controller, or other logic device on the device 10, that is used to readout, byte-by-byte, data from the cache 40. Typically, NAND flash memory devices contain banks of memory, each bank including its own array 20, sense amplifiers 30 and data cache 40.

FIG. 1 illustrates the device 10 performing a data readout of cached page x data (from cache 40) while simultaneously performing a fetch of page x+1 data from the array 20 into the sense amplifiers 30. The readout from the cache 40 is a sequential, byte-by-byte, readout under the control of the pointer 60, beginning from byte 0 and ending at the last byte in the page (shown as byte 2111). During these operations, the controller 50 sets the status of the read/busy indicator to "busy," which may be monitored by an application or other system component. Since each byte of data takes about 25 ns to be readout of the cache 40, a whole page of 2112 bytes will take about 50 µs. A data fetch operation takes about 20-25 µs. Thus, as shown in FIG. 1, the system/application utilizing the device 10 can typically hide the data fetch time during the sequential data output time of 50 µs.

Figure 2:
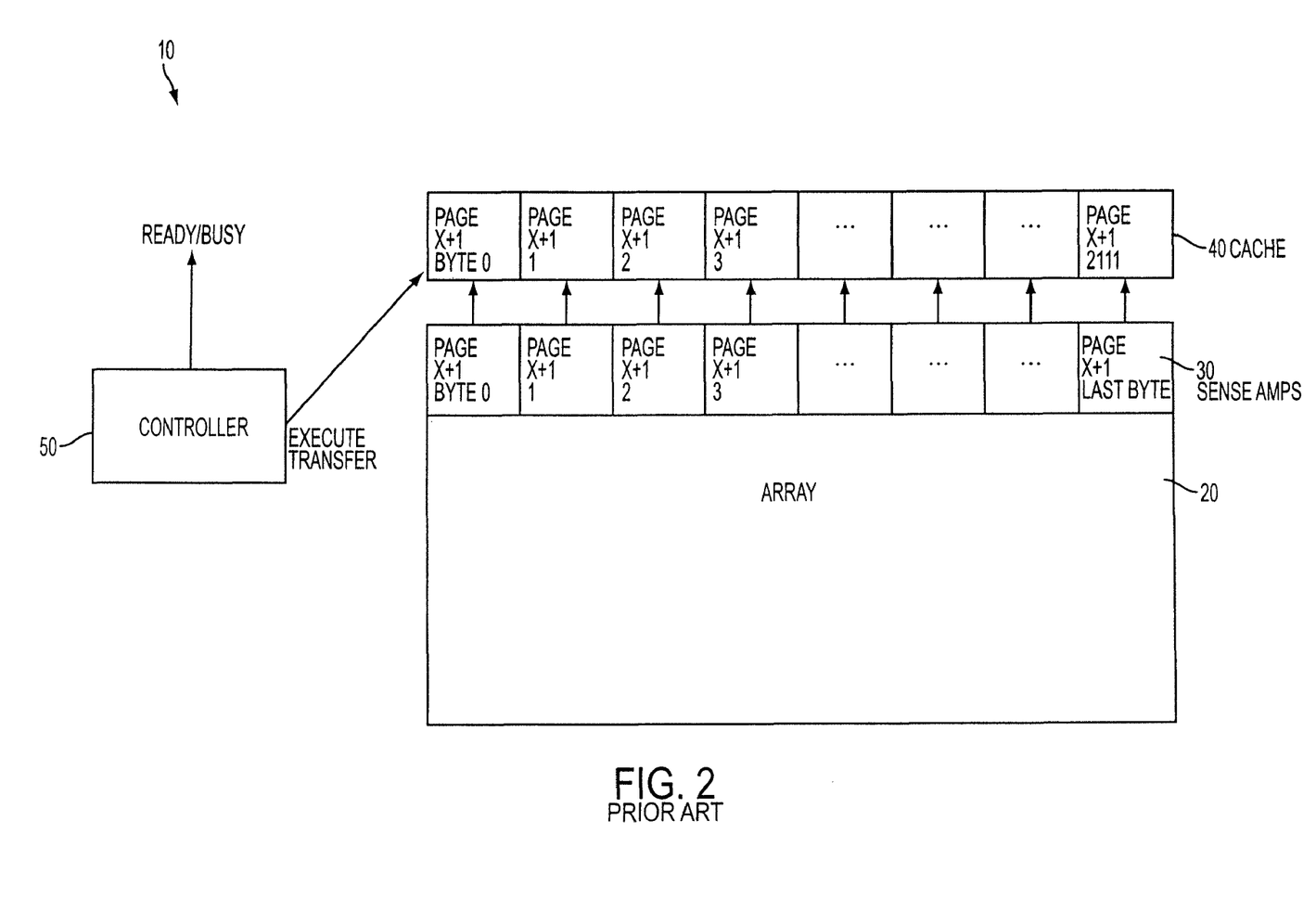
FIG. 2 illustrates the conventional memory device of FIG. 1 performing a data transfer of page x+1 data.
Figure 3:
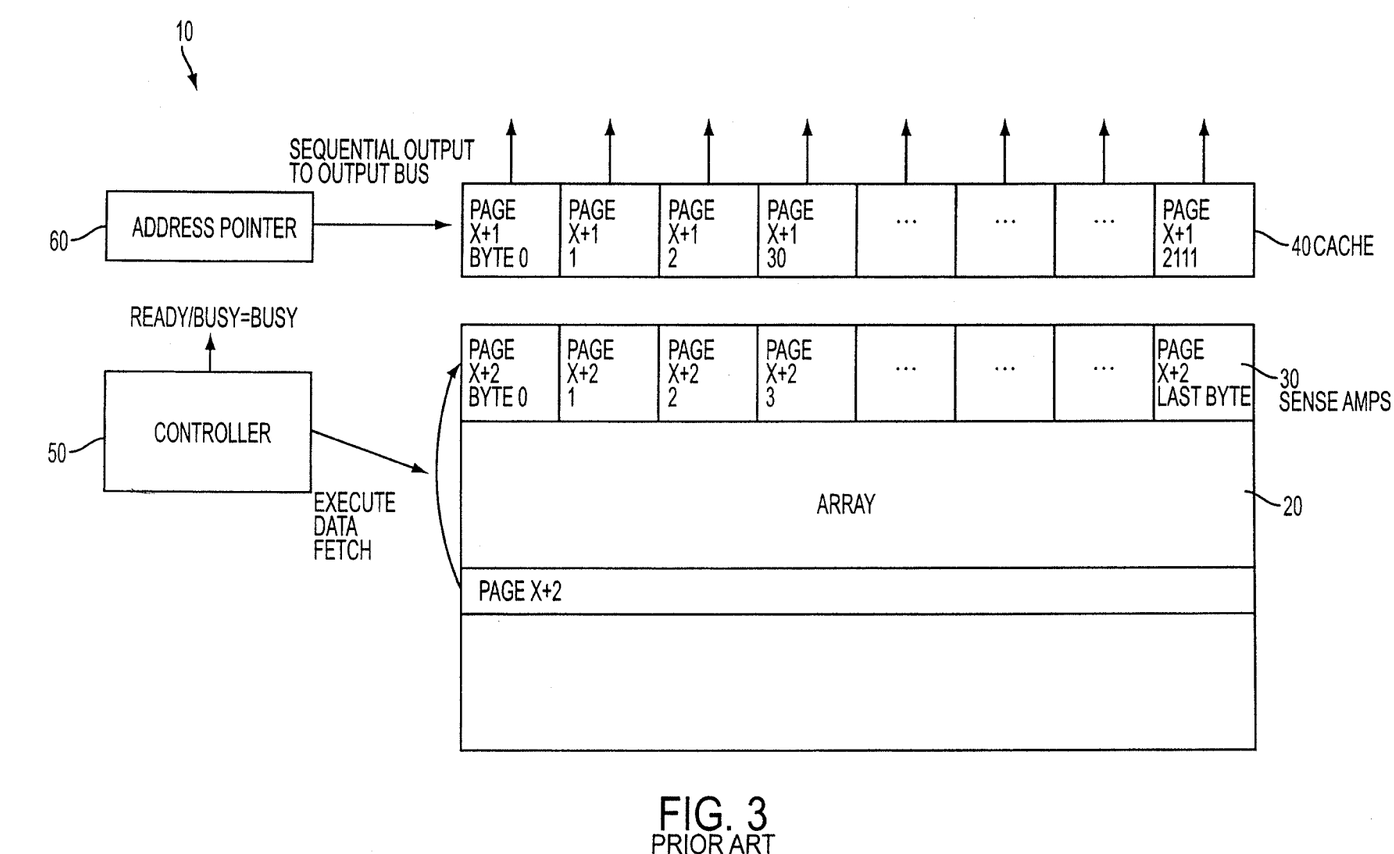
FIG. 3 illustrates the conventional memory device of FIG. 2 performing data readout of cached page x+1 data and a fetch of page x+2 data.

Referring now to FIG. 2, once the sequential output of the cached page (i.e., page x) is finished, the controller 50 can issue a transfer command to send page x+1 data from the sense amplifier 30 to the cache 40. Referring to FIG. 3, once the transfer is complete, the controller 50 will initiate a data fetch operation for the next page (i.e., page x+2) and the address pointer 60 will begin the sequential, byte-by-byte, readout of the cached page x+1 data (beginning from byte 0). The transfer illustrated in FIG. 2 takes finite amount of time, usually around 2 µs. The issuance of the transfer command and the approximate time to perform the transfer effectively interrupts the data output operation (FIG. 3), which slows down the output throughput of the device 10. The system/application utilizing the device 10 may also suffer additional overhead in hardware and/or software execution time. These effects are undesirable.

BRIEF DESCRIPTION OF THE DRAWINGS

Features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 4:
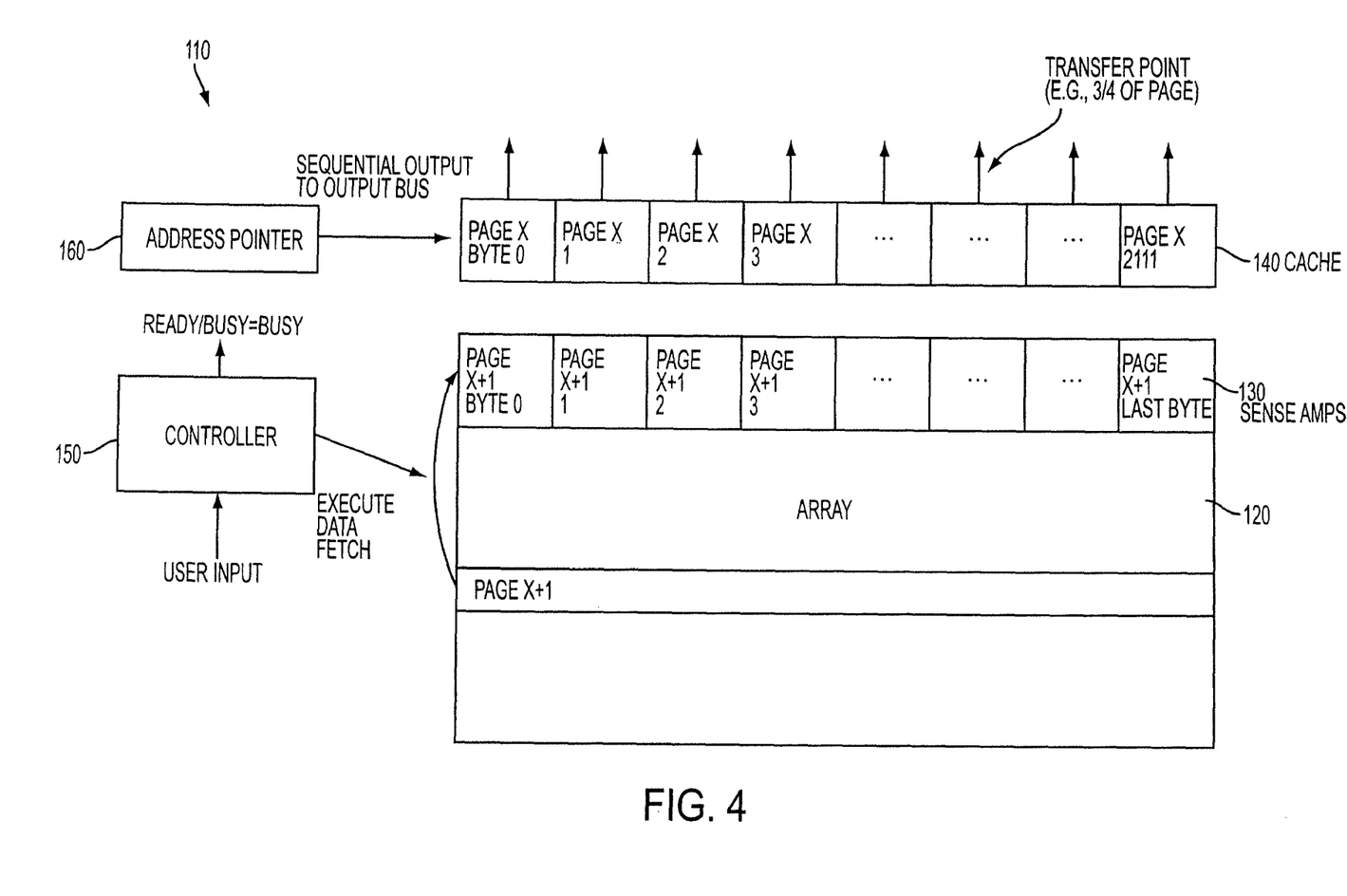
FIG. 4 illustrates a memory device according to the invention performing data readout of cached page x data and a fetch of page x+1 data.

FIG. 4 illustrates a memory device 110 e.g., a NAND flash memory device, constructed in accordance with an embodiment of the invention. The memory device 110 includes a memory array 120, sense amplifiers 130, data cache 140 and a controller 150. The controller 150 controls operation of the device 110 and, as part of its operation, monitors an address pointer 160, which may be part of an address register, input/output controller, or other logic device on the device 110, that is used to control byte-by-byte readout from the cache 140. The controller 150 is configured to accept a user input from the system/application utilizing the device 110.

Although not shown, the memory device 110 contains a plurality e.g., at least four, banks of memory, each bank including its own array 120, sense amplifiers 130 and data cache 140. It should be appreciated that the device 110 could comprise data registers, input/output logic and other logic that would normally be associated with a memory device 110 such as a NAND flash memory device. In addition, the invention is not limited to NAND flash memory devices; in fact, the invention may be included on any memory device that utilizes caching and fetching of data prior to the data being readout from the device.

The memory device 110 of the invention is configured to sequentially output multiple pages of data without substantial interruption and thus, improves the output data throughput over the prior art device 10 (FIGS. 1-3). This is achieved by selecting a "transfer point" such as e.g., ¾ of a page, which is a point during the sequential readout from the cache 140 where it is safe to begin transferring a portion of fetched data from the sense amplifiers 130 into the cache 140 even though data is currently being output from the cache 140. Since the transfer operation occurs while data is being output, it is possible to continually output data from the cache 140 (spanning multiple pages) without substantial interruption (described below in more detail).

FIG. 4 illustrates the transfer point as being the point where ¾ of the cached page x data has been readout; that is where ¾ of the cached bytes of a page have been read out. The ¾ page transfer point is just one example of the transfer point that may be used in the invention and is used herein solely to describe the operation of the device 110 in the illustrated example. As is discussed below in more detail, the transfer point may be calculated based on the speed of the device, the number of bytes to fetch/transfer and the time required to fetch each byte, and/or other specifications of the device 110 or the application/system utilizing the device 110. In addition, as is described below in more detail, the controller 150 may input a user selectable transfer point from the application/system utilizing the device 110.

In the illustrated example, it is presumed that each page (i.e., page x, page x+1, page x+2, etc.) comprises 2112 bytes. In the current example, the ¾ page transfer point (i.e., 1584 bytes=2112 bytes/page x ¾ page) is a safe transfer point since in the given example it is presumed that it takes approximately 50 µs to sequentially output all of the data from the cache 140, it takes approximately 25 µs to fetch the next page (i.e., page x+1) and a ¾ page output (i.e., 1584 bytes) should take approximately 37 µs. As can be seen from the example, there is a 12 µs margin between the time it takes to output ¾ of a page and the time it takes to fetch the next page. As should be appreciated, the margin can be further refined in a desired embodiment if the application requires a more seamless operation.

Figure 5:
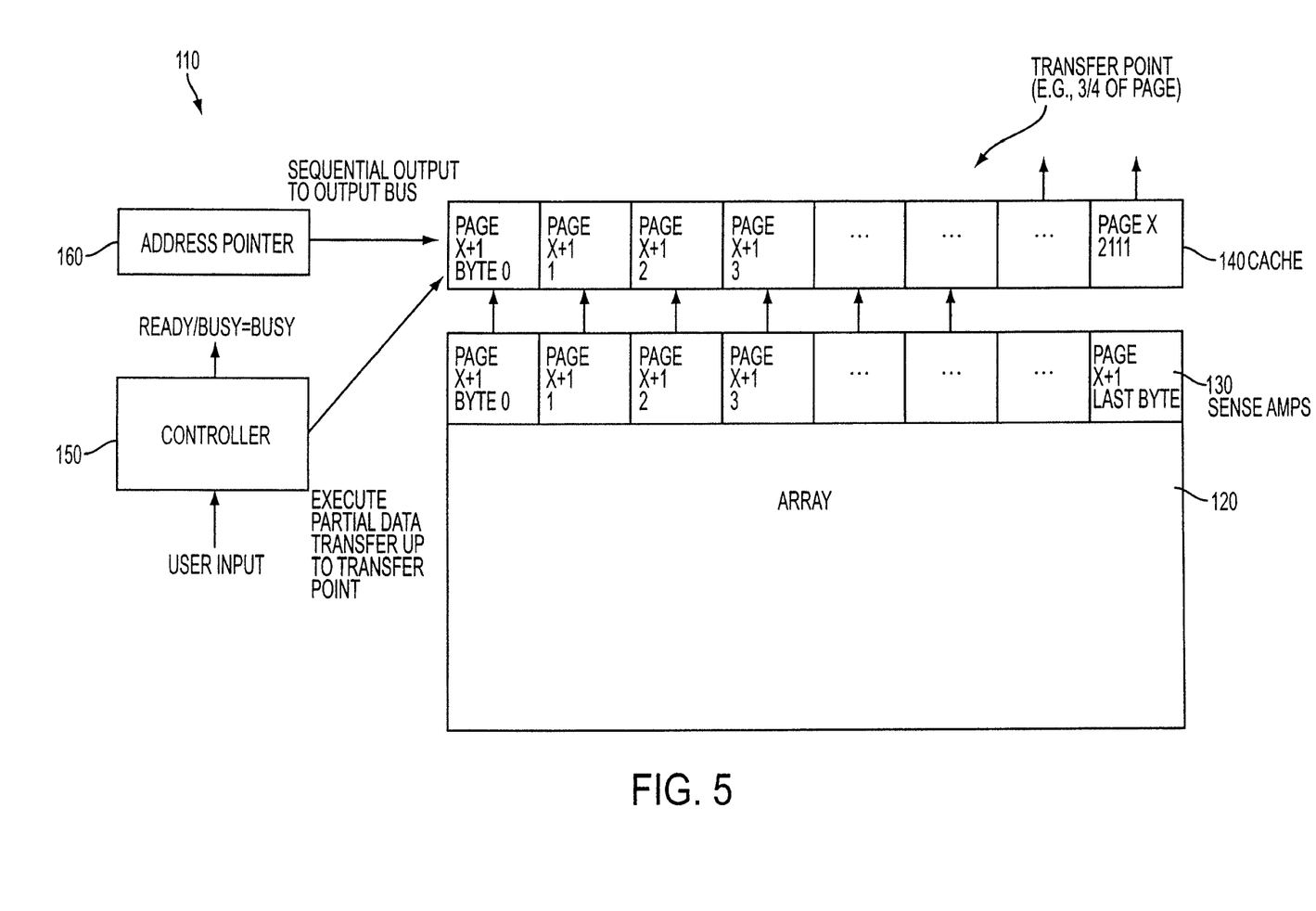
FIG. 5 illustrates the memory device of FIG. 4 performing a data transfer of a first portion of page x+1 data while cached page x data continues being readout from the device.
Figure 6:
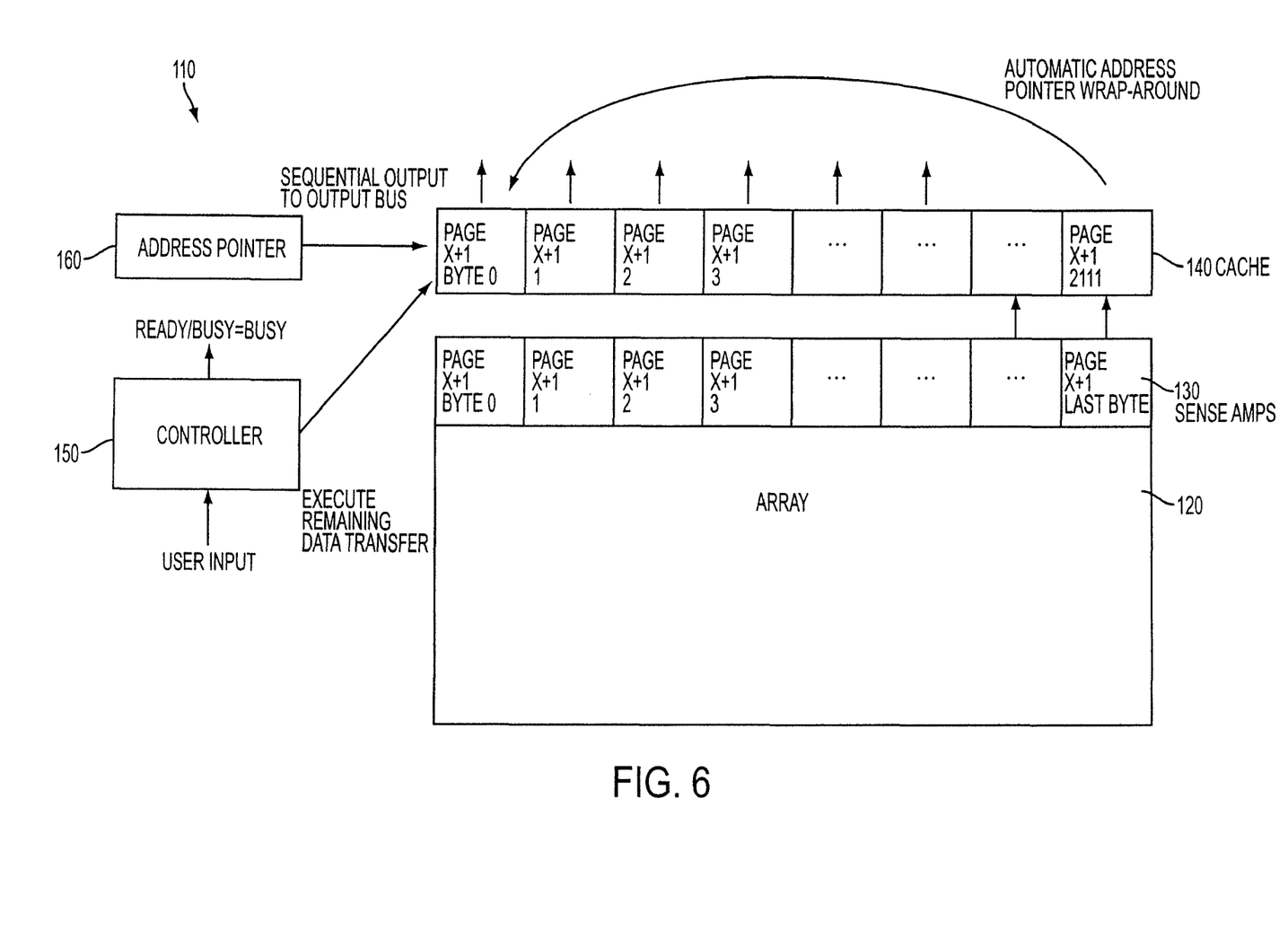
FIG. 6 illustrates the memory device of FIG. 5 performing a data transfer of a second portion of page x+1 data and the initiation of a readout of the first portion of cached page x+1 data.
Figure 7:
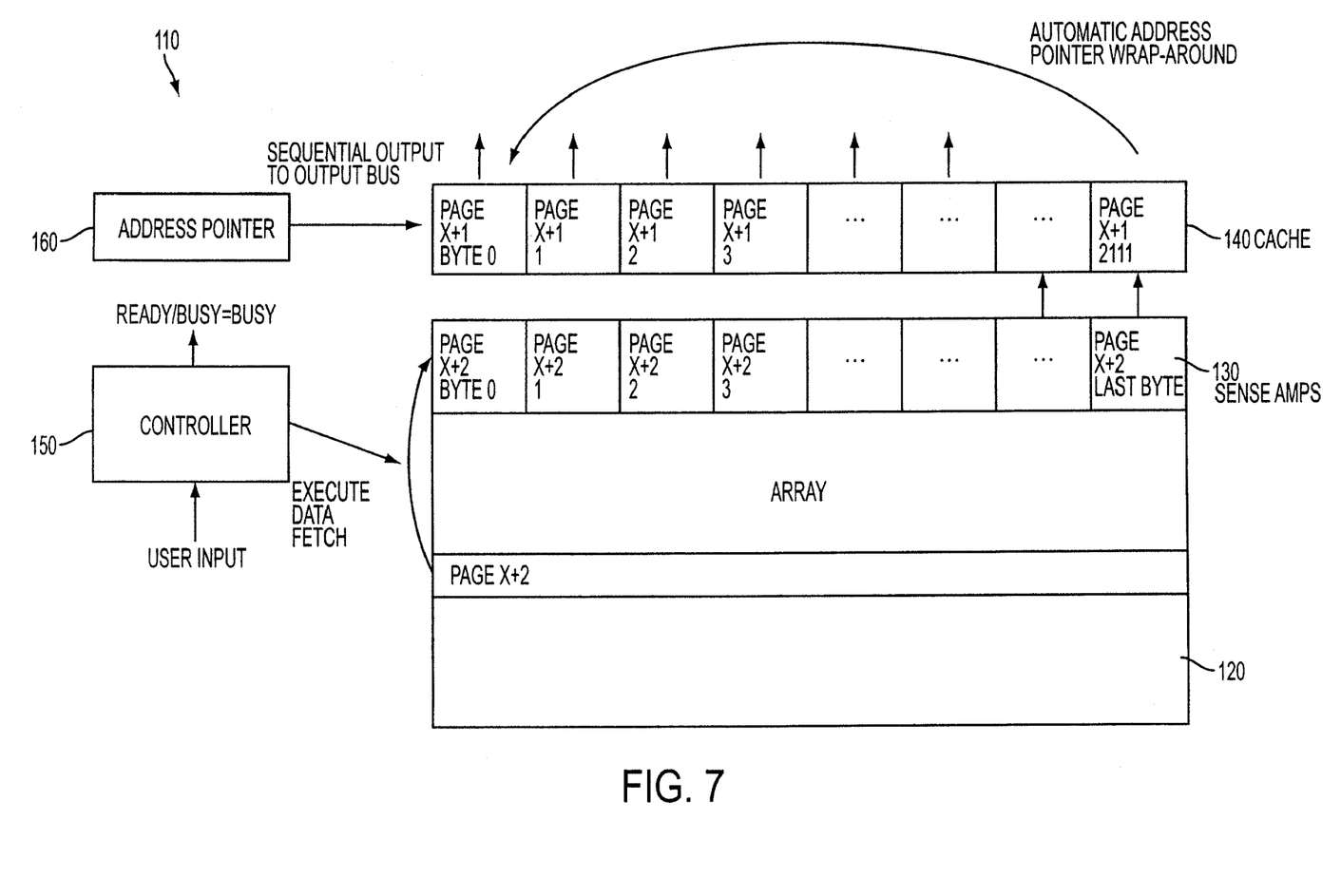
FIG. 7 illustrates the memory device of FIG. 6 performing a data transfer of a first portion of page x+2 data while the remaining cached page x+1 data is being readout from the device.

As shown in FIG. 4, the invention fetches page x+1 data from the array 120 (into the sense amplifiers 130) while sequentially outputting cached page x data at the same time. The cache output occurs byte-by-byte, beginning at byte 0. Referring to FIG. 5, the controller 150 monitors address pointer 160 and initiates the transfer of ¾ of the page x+1 data from the sense amplifiers 130 to the cache 140 once ¾ of the page x cached data has been output (i.e., the output operation reaches the transfer point). That is, because ¾ of the page x data has been output, ¾ of page x+1 can be transferred into the cache without corrupting the readout. As shown in FIGS. 5 and 6, the readout of the cached page x data continues and once the page x data is completely readout of the cache 140, the address pointer wraps around to the beginning of the cache 140. At this point, the transferred portion of the page x+1 data can begin to be readout from the cache 140. At the same time, the controller initiates the transfer of the remaining page x+1 data (e.g., ¼ of the page) because the last ¼ of the cache 140 is free. Once the remaining page x+1 data is transferred to the cache 140, the controller initiates a fetch operation for page x+2 data while the cached page x+1 data is being sequentially output (FIG. 7). This process repeats for all subsequent pages that are to be readout of the device 110.

As set forth above, FIGS. 4-7 illustrate the transfer point as being the point where ¾ of the cached data has been readout. The ¾ page transfer point is just one example of the transfer point that may be used in the invention and was used in the above example solely to describe the operation of the device 110. It should be appreciated that the transfer point may be calculated based on the speed of the device, the number of bytes to fetch/transfer, the time required to fetch each byte and/or desired output throughput or other desired application specification. Any transfer point used must at a minimum be longer than the fetch period plus some specified margin (hereinafter the "minimum value"), which ensures that enough space has been freed up in the cache 140 (i.e., a sufficient number of cached bytes have been output) prior to transferring a portion of the next page into the cache 140. An exemplary transfer point would be above the ¾ page, but less than a full page, which still ensures a desired level of uninterrupted readout from the cache 140. The selected transfer point can be within the range defined by the maximum and minimum values as required by the application/system utilizing the device 110.

In addition, the controller 150 may input a user selectable transfer point from the application/system utilizing the device 110. In the above example, the ¾ page transfer point (i.e., 2112 bytes/page × ¾ page=1584 bytes) was determined to be a safe transfer point because there was about a 12 μs margin. This margin can be reduced or increased depending upon the application/system utilizing the device 110 and/or the desired output throughput of the device 110.

Figure 8:
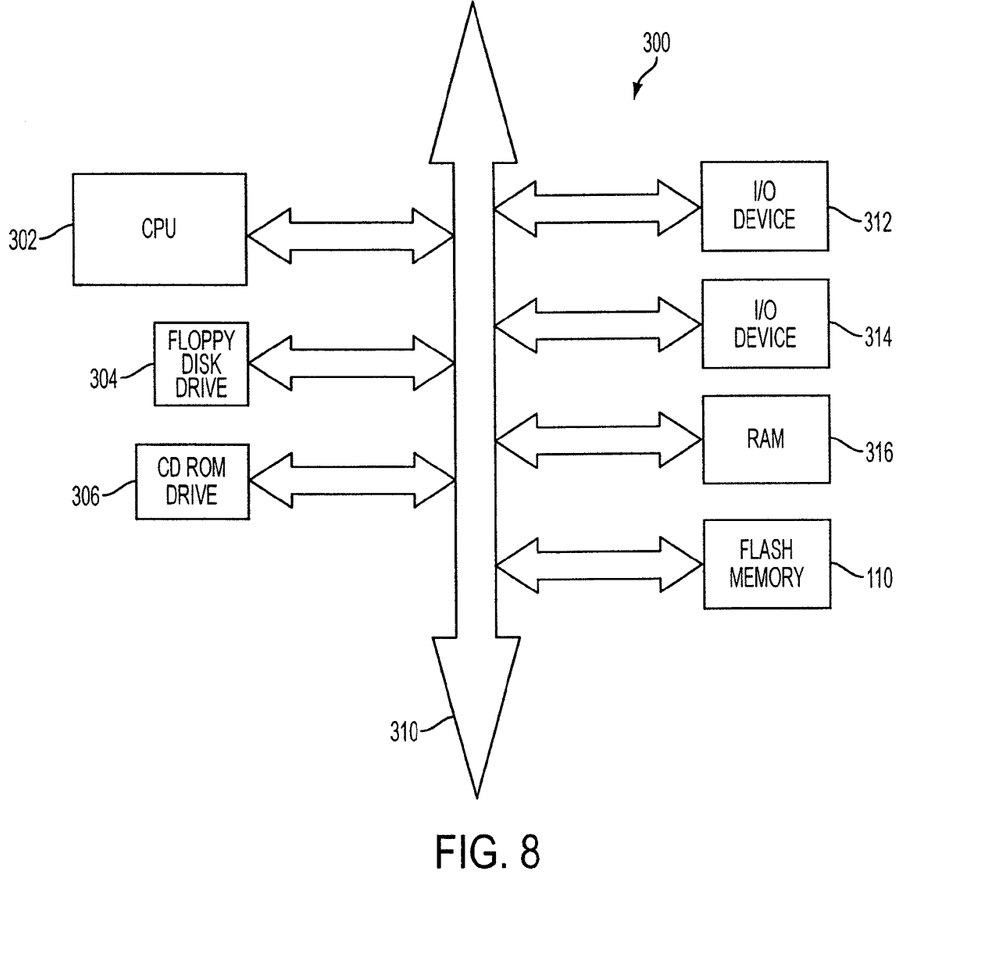
FIG. 8 illustrates a processor system incorporating a memory device constructed in accordance with an embodiment of the invention.

FIG. 8 illustrates a processor system 300 utilizing a memory device, e.g., a flash memory device 110, constructed in accordance with the invention. That is, the memory device 110 achieves uninterrupted cache readout (described above with reference to FIGS. 4-7). The system 300 may be a computer system, camera system, PDA, cellular telephone, a process control system or any system employing a processor and associated memory. The system 300 includes a central processing unit (CPU) 302, e.g., a microprocessor, that communicates with the flash memory 110 and an I/O device 312 over a bus 310. It must be noted that the bus 310 may be a series of buses and bridges commonly used in a processor system, but for convenience purposes only, the bus 310 has been illustrated as a single bus. A second I/O device 314 is illustrated, but is not necessary to practice the invention. The processor system 300 also includes random access memory (RAM) device 316 and may include a read-only memory (ROM) device (not shown), and peripheral devices such as a floppy disk drive 304 and a compact disk (CD) ROM drive 306 that also communicate with the CPU 302 over the bus 310 as is well known in the art.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not limited by the foregoing description or drawings but is only limited by the scope of the appended claims.

What is claimed as new and desired to be protected by Letters Patent of the United States is:

1. A method of operating a memory device comprising the steps of:
   sequentially outputting byte-by-byte a first data page from a cache; and
   transferring a portion of a second data page into a first portion of the cache after a selected portion of the first data page has been output from the first portion of the cache and while a remainder of the first data page is being output byte-by-byte from a second portion of the cache.

2. The method of claim 1, wherein a size of the selected portion of the first data page is determined based on a speed of the memory device.

3. The method of claim 1, wherein a size of the selected portion of the first data page is determined based on a number of bytes to transfer.

4. The method of claim 1, wherein a size of the selected portion of the first data page is determined based on a specification of one of the memory device or an application utilizing the memory device.

5. The method of claim 1, wherein a size of the selected portion of the first data page is determined based on a desired throughput.

6. The method of claim 1, further including:
   transferring a remainder of the second data page into the cache after all of the first data page has been output; and
   sequentially outputting the second data page from the cache.

7. The method of claim 6, further including:
   transferring a portion of a third data page into the cache after a selected portion of the second data page has been output and while the remainder of the second data page is being output from the cache.

8. A method of operating a memory device comprising the steps of:
   sequentially outputting a first data page from a cache; and
   transferring a portion of a second data page into the cache after a selected portion of the first data page has been output and while a remainder of the first data page is being output from the cache,
   wherein a size of the selected portion of the first data page is determined based on a time required to fetch each byte.

9. A method of operating a memory device comprising the steps of:
   sequentially outputting byte-by-byte a first data page from an output section of the memory device;
   fetching a second data page from a storage section of the memory device while a first portion of the first data page is being output byte-by-byte from a first portion of the output section; and
   transferring a first portion of the second data page into the first portion of the output section after the first portion of the first data page has been output and while a second portion of the first data page is being output byte-by-byte from a second portion of the output section.

10. The method of claim 9, wherein the transferring step is initiated at a transfer point selected based on a speed of the memory device.

11. The method of claim 9, wherein the transferring step is initiated at a transfer point selected based on a number of bytes to transfer.

12. The method of claim 9, wherein the transferring step is initiated at a transfer point selected based on a specification of one of the memory device or an application utilizing the memory device.

13. The method of claim 9, wherein the transferring step is initiated at a transfer point selected based on a desired throughput.

14. The method of claim 9, further including:
   transferring a second portion of the second data page into the second portion of the output section after all of the first data page has been output;
   sequentially outputting the first portion of the second data page from the first portion of the output section.

15. The method of claim 14, further including:
   fetching a third data page from the storage section while the first portion of the second data page is being output.

16. The method of claim 15, further including:
   transferring a first portion of the third data page into the first portion of the output section after the first portion of the second data page has been output and while the second portion of the second data page is being output from a second portion of the output section.

17. A method of operating a memory device comprising the steps of:
sequentially outputting a first data page from an output section of the memory device;
fetching a second data page from a storage section of the memory device while a first portion of the first data page is being output; and
transferring a first portion of the second data page into a first portion of the output section of the device after the first portion of the first data page has been output and while a second portion of the first data page is being output from a second portion of the output section,
wherein the transferring step is initiated at a transfer point selected based on a time required to fetch each byte.

18. A method of operating a memory device comprising the acts of:
sequentially outputting byte-by-byte a first data page from an output portion of the memory device; and
transferring a first portion of a second data page into a first portion of the output portion of the device after a first portion of the first data page has been output from the first portion of the output portion and while a second portion of the first data page is being output byte-by-byte from a second portion of the output portion,
wherein the output portion of the memory device is a cache memory and the second data page is transferred from a sense amplifier into the first portion of the cache memory.

19. The method of claim 18, wherein the transferring step is initiated at a transfer point selected based on one of a speed of the memory device, a number of bytes to transfer, or a time required to fetch each byte.

20. The method of claim 18, wherein the transferring step is initiated at a transfer point selected based on a specification of one of the memory device or an application utilizing the memory device.

21. The method of claim 18, wherein the transferring step is initiated at a transfer point selected based on a desired throughput.

22. A method of operating a memory device comprising the steps of:
sequentially outputting a first page from a cache of the device;
fetching a second page from a memory array of the device;
transferring a portion of the second page into a first portion of the cache once it has been determined that a selected portion of the first page has been output from the first portion of the cache and while a remainder of the first page is still being output from a second portion of the cache; and
transferring a remainder of the second page into the second portion of the cache after all of the first page has been output.

23. The method of claim 22, wherein an amount of data in the selected portion of the first data page corresponds to one of a speed of the memory device, a number of bytes to transfer, or a time required to fetch each byte.

24. The method of claim 22, wherein an amount of data in the selected portion of the first data page corresponds to a specification of one of the memory device or an application utilizing the memory device.

25. The method of claim 22, further including:
fetching a third page from the memory array;
transferring a portion of the third page into the first portion of the cache once it has been determined that a selected portion of the second page has been output and while a remainder of the second page is still being output from the second portion of the cache; and
transferring a remainder of the third page into the second portion of the cache after all of the second page has been output.

* * * * *